United States Patent
Wu et al.

(10) Patent No.: US 7,563,508 B2
(45) Date of Patent: Jul. 21, 2009

(54) DIFFUSION BEADS WITH CORE-SHELL STRUCTURE

(75) Inventors: Hsien-Ming Wu, Longtan Township, Taoyuan County (TW); Chang-Neng Shauo, Longtan Township, Taoyuan County (TW); Hsiou-Jeng Shy, Sanchong (TW); Wen-Yung Shu, Sindian (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 38 days.

(21) Appl. No.: 11/806,088

(22) Filed: May 30, 2007

(65) Prior Publication Data

US 2008/0299393 A1  Dec. 4, 2008

(51) Int. Cl.
B32B 5/16 (2006.01)
G02B 5/02 (2006.01)
G02F 1/1333 (2006.01)

(52) U.S. Cl. .......................... 428/407; 349/86; 349/112; 359/599; 428/325; 428/327; 428/328; 428/331; 428/913

(58) Field of Classification Search ................. 428/403, 428/407, 323, 327, 328, 325, 331, 913; 349/86, 349/112; 359/599
See application file for complete search history.

(56) References Cited

U.S. PATENT DOCUMENTS

| | | | | |
|---|---|---|---|---|
| 6,057,035 A * | 5/2000 | Singh et al. | ................. | 428/403 |
| 6,312,807 B1 * | 11/2001 | Ludwig et al. | ............... | 428/403 |
| 6,479,146 B1 * | 11/2002 | Caruso et al. | ............... | 428/403 |
| 6,531,221 B1 * | 3/2003 | Schuhmacher et al. | ....... | 428/402 |
| 6,709,143 B2 * | 3/2004 | Harada et al. | ............... | 362/558 |
| 6,759,463 B2 * | 7/2004 | Lorah et al. | .................. | 524/445 |
| 6,844,047 B2 * | 1/2005 | Kaminsky et al. | ........... | 428/141 |
| 6,871,994 B2 * | 3/2005 | Harada et al. | ............... | 362/558 |
| 7,049,353 B2 * | 5/2006 | Conroy et al. | ............... | 523/216 |
| 7,210,835 B2 * | 5/2007 | Chang et al. | ................. | 362/558 |
| 7,291,665 B2 * | 11/2007 | Lorah et al. | ................. | 524/445 |
| 7,474,464 B2 * | 1/2009 | Wang et al. | .................. | 359/599 |

* cited by examiner

Primary Examiner—H. (Holly) T Le
(74) Attorney, Agent, or Firm—Rosenberg, Klein & Lee

(57) ABSTRACT

The diffusion beads according to the present invention have a core-shell structure of multi-layered beads consisting of organic and inorganic materials. The diffusion beads are used for improving functions of conventional organic and inorganic polymer diffusion beads. The structure according to the present invention no only enhances light scattering characteristics of the diffusion beads, but also strengthens the thermal stability and geometric stability thereof.

6 Claims, 1 Drawing Sheet

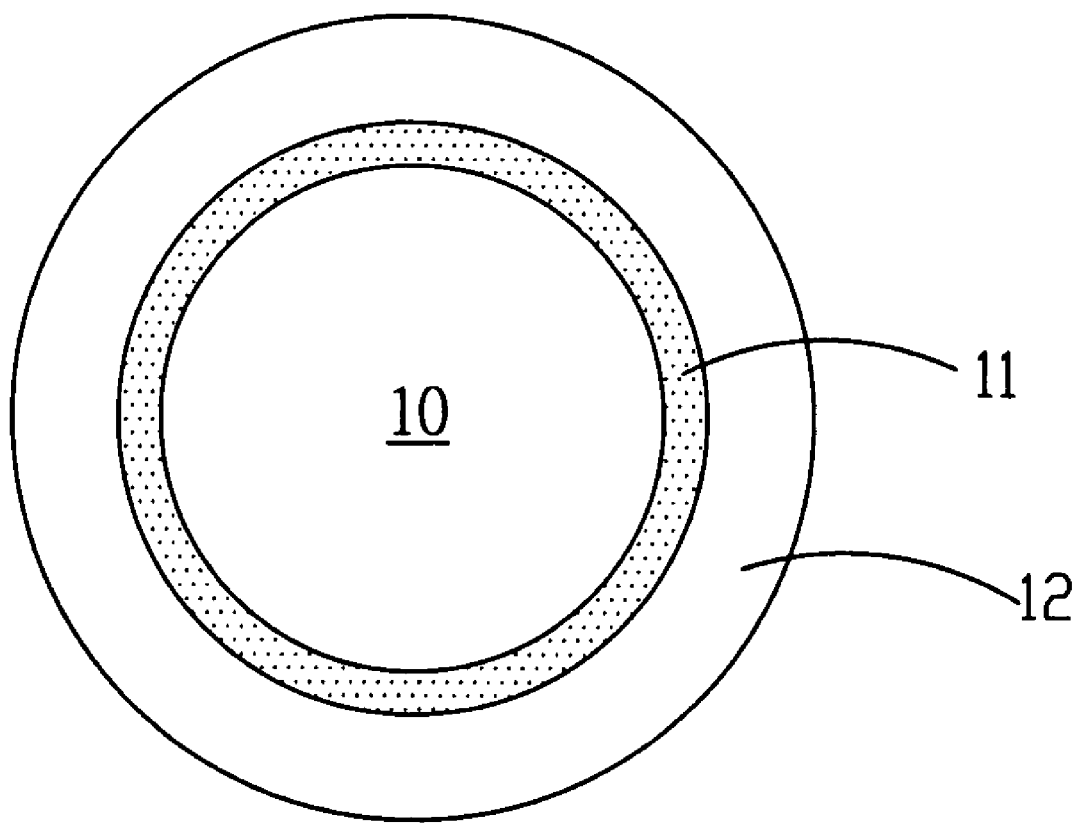

DIFFUSION BEADS WITH CORE-SHELL STRUCTURE

FIELD OF THE INVENTION

The present invention relates generally to a structure of light diffusion beads and a manufacturing technology thereof. The structure according to the present invention is a core-shell structure consists of a variety of materials, which can be organic polymer and inorganic materials. The diffusion beads have an organic/inorganic core-shell structure with excellent optical scattering characteristics, geometric stability, and heat resistibility, and can be applied to diffusion sheets/plates for enhancing light scattering characteristics and thermal stability. The applications include light boxes and diffusion sheets/plates in backlight modules of liquid crystal displays. The core-shell structured beads can be added to the substrates of diffusers, and related processes of coating, ejection, and extruding follow.

BACKGROUND OF THE INVENTION

A liquid crystal display (LCD) is a display apparatus without spontaneous light source. Thereby, a backlight source is needed for displaying function. The module consists of the whole set of backlight source is named a backlight module, which is comprised of a light source and an optical lens set. The optical lens set includes a light guide plate, a diffusion sheet, and prisms.

The main function of the diffusion sheet is to make the backlight source uniform. In conventional diffusion sheets, chemical particles are added to substrates of diffusion sheets as scattering particles. In current diffusion sheets, particles are distributed within resin substrates. When light passes through the diffusion sheets, it will continuously pass through media with two different refraction indexes. Thereby, light will encounter many refraction, reflection, and scattering. Consequently, optical scattering effect occurs.

In the following, a few recent inventions related to diffusers are taken as examples:

1. As described in the U.S. Pat. No. 6,888,663, clay is used as diffusion beads. After swelling and wetting treatments as well as interface quality improvement, thermal process is used to mix with polymer to produce the diffusion sheet. The advantage thereof is that only a small amount of clay (<3 wt %) is needed to produce decent effect (Haze~80%, tranparency~80%). In addition, inorganic materials have the advantages of ultraviolet, heat, and weather resistant. The drawback thereof is that clay will aggregate seriously, resulting in light scattering and reduction in transparency.

2. As described in the U.S. Pat. No. 6,871,994, polymer beads are used as diffusion material. By adding adhesive, paint mixture is formed. Then it is coated on transparent polymer substrates to form diffusion sheets. The advantage of using polymer beads as diffusion material is that transparency is superior. However, the main disadvantage thereof is that polymer is not ultraviolet (UV) resistant. In addition, heat and weather resistibility and geometric stability is inferior to inorganic particles.

3. As disclosed in Taiwan Patent Publication No. 200506035, a high light diffusivity, superior color tone light diffusing plate is shown. The advantage thereof is that heat and deformation resistibility of the light diffusing plate is maintained by adding organic UV absorber and stabilizer in process. The disadvantage thereof is that in the manufacturing process, in addition to adding diffusion material, other materials such as UV absorbers and stabilizers have to be added as well, which will complicate the system and hence will affect stability thereof. Besides, the overall material cost will increase accordingly. Another advantage of using organic absorbers is their deterioration after absorbing UV light.

According to the analysis described above, the present invention combines the advantages of the organic (polymer) and inorganic (clay) materials described above to design reflection, UV, heat, and weather resistant diffusion beads. Nanoclay can be applied to diffusion beads of diffusion sheets with the effects of reflection resistibility and UV light isolation. Reflection resistibility in diffusion sheets can enhance utility rate of light sources, and thereby increases luminance of the overall module. In addition, UV light isolation can lengthen lifetime of the diffusion sheets. Thereby, when applying nanoclay to diffusion sheets, reflection resistibility and UV light isolation, as well as light diffusion effect, can be attained.

The diffusion beads according to the present invention have a core-shell structure combined by organic and inorganic materials. They are heat and weather resistant. In addition, because of the multi-layer structure, they have the advantage of multiple light scattering. That is, in terms of the performance of the diffusion sheets, the usage of materials is less and the thickness of the diffusion sheets is thinner. Consequently, the diffusion beads according to the present invention conform to the market trend of lightness, thinness, and low cost. Furthermore, because the diffusion beads according to the present invention have formed a core-shell structure, the material of the outermost layer can be designed to be compatible with substrates with other materials. Thereby, the problems of dispersion and aggregation do not exist, which is another advantage of the present invention.

SUMMARY

It is discovered in earlier researches that normal composite materials are materials with the dispersed phase of micrometer-scale inorganic materials dispersed in the continuous phase of organic polymers. This is an addition effect in macroscopic properties, and is the property of normal composite materials, in which the rigidity, toughness, and heat resistibility of the original material are enhanced. However, if the dispersed phase is made to nanometer scale, in the perspective of surface area, the contact area is increased by many times. Thereby, this is a multiplication effect in microscopic properties.

Clay is an inorganic material existing in nature. Cations are adhered between clay layers to maintain electrical neutrality. The adhered cations in clay tend to be exchanged by other organic or inorganic cations. By intercalation reactions of intercalating organic modifiers between layers, the interval between layers is lengthened. The hydrophobicity of organic materials can be mixed with polymers to form nanocomposite materials with excellent compatibility and exfoliation. Thereby, the optical, mechanical, and heat resistant properties of the polymers are further enhanced.

The advantage of applying clay in composite materials is its particular properties in physical, chemical, and mechanical characteristics. It is an inorganic mineral, and is difficult to be applied. Clay has mainly a laminated structure of silicate composed of aluminum oxide ($Al_2O_3$) and silicon dioxide ($SiO_2$) with around one micrometer of bead diameter. Each bead stack is piled up by hundreds of to thousands of layers. In average, each bead stack has approximately 850 layers of silicate sheets with each of the layer being 100 to 1000 in aspect ratio and being 100 nm×100 nm×1 nm in average cubic ratio. The interval (d-spacing) between sheets is around 6 to 17 Å, mainly distributed between 11 and 13 Å.

The ions placed between layers can be divided into the cation exchange clay, the anion exchange clay, and the neutral ion exchange clay, wherein the cation exchange clay is the main usage. The cations are mostly $Li^+$, $Na^+$, $Ca^{2+}$, $Mg^{2+}$, $Ba^{2+}$, $La^{2+}$, and $Ce^{2+}$. In addition, a part of water of crystallization is contained as well. These cations provide the cation exchange capacity (CEC value) to replace the cations contained in clay. Besides, the CEC value changes with different materials.

There are many kinds of clay. The common ones include smectite, mica, vermiculite, and brittle clay, wherein Montmorillonite of the cation exchange clay of the smectite clay is mostly used.

A liquid crystal display (LCD) is a display apparatus without spontaneous light source. Thereby, a backlight source is needed for displaying function. The module consists of the whole set of backlight source is named a backlight module, which is comprised of a light source and an optical lens set. The optical lens set includes a light guide plate, a diffusion sheet, and prisms.

The main function of the diffusion sheet is to make the backlight source uniform. In conventional diffusion sheets, chemical particles are added to substrates of diffusion sheets as scattering particles. In current diffusion sheets, particles are distributed within resin substrates. When light passes through the diffusion sheets, it will continuously pass through media with two different refraction indexes. Thereby, light will encounter many refraction and reflection. Consequently, optical scattering effect occurs.

The present invention takes advantages of organic and inorganic materials to design and manufacture high-efficiency diffusion beads. According to the present invention, polystyrene is first used as the core of the diffusion beads. The outer layer coats with acrylic modified clay. Then the outermost layer coats with an acrylic layer. The three-layered structure formed thereby has excellent light scattering effect. In addition, owing to the modification effect of the acrylic modified clay, the diffusion beads have superior stability. In respect to light diffusion, because of the multi-layer core-shell structure, the diffusion beads with this structure have materials with multiple refraction indexes. Thereby, in comparison with other diffusion beads with a single material, the scattering efficiency of the core-shell structure is higher. Moreover, the core-shell structure also has the advantage of inorganic fortified composite materials, that is, heat and weather resistant. Another advantage of the diffusion beads according to the present invention is having the surface modification by hydrophilic group or hydrophobic group. Hence, it is easy that the diffusion beads be mixed with other polymer substrates.

The distinguishing feature of the present invention is that the nano-optical characteristics of acrylic modified clay as well as the fortifying characteristics of the stuffed nanocomposite materials are used to make the diffusion beads according to the present invention accomplish the purposes of light scattering and material fortification. Thereby, the diffusion beads are more suitable to be applied in the backlight modules of LCDs.

BRIEF DESCRIPTION OF THE DRAWINGS

The FIGURE shows a schematic diagram of the core-shell structured diffusion bead according to the present invention.

DETAILED DESCRIPTION

In manufacturing technology, the present invention applies two techniques including the polymerization technique of polystyrene (PS) and the surface coating technique of core-shell. The experimental steps include polymerization of PS, swelling and wetting, dispersion, and interface modification of nanoclay, coating of PS (core) and acrylic modified clay (shell), and coating of outermost PMMA. Besides, an embodiment of a diffusion sheet will be described.

1. Polymerization of PS Core:

Take 57 grams of alcohol solvent and pour it into a three-neck round-bottom flask. Then, 0.5 gram of dispersion agent polyvinylpyrrolidone (PVP) is added. After PVP is dissolved completely, raise the temperature to 60° C. Pour 22 grams of styrene monomer with 0.1 gram of initiator 2,2-azobisisobutrionitrile dissolved therein. Apply argon for 20 minutes for eliminating oxygen in order to prevent reduction in reaction rate. Under the protection of stir and argon, stir the solution at 200 rpm. After 24 hours, the reaction is ceased. By mixing an appropriate amount of 2-hydroxyethyl methacrylate (HEMA) in styrene monomer and following the steps described above, PS beads with surface modification can be obtained.

PS beads are acquired by centrifugal method. In order to avoid temperature raise due to high-speed centrifugal force, which causes deformation and coherence of the beads, refrigerated centrifuge is controlled at 25° C. After centrifugal sedimentation at four different speeds, which are 6000 rpm, 4500 rpm, 3000 rpm, and 1500 rpm, respectively, upper-layer solution is removed. Then, after water rinsing and dispersion, the final product is collected. Take a part of the sample and naturally dry in the shade. Afterwards, use a scanning electron microscope (SEM) to observe appearance and to take pictures. By judging from the SEM pictures, the distribution of bead diameters is between 2 and 4 μm (shown as 10 in the FIGURE).

2. Swelling and Wetting, Dispersion, and Interface Modification of Nanoclay:

Perform swelling and wetting as well as dispersion processes on nanoclay (Southern Clay Co., CEC value 120 meq/100 g, d-spacing 12.41 Å, thermal stability 500° C.) in a ball mill by using sodium hexametaphosphate as the dispersion agent. The experimental procedure is described as follows:
(a) Pre-mixing process: Before the ball-milling step on the nanoclay, a swelling and wetting process is performed in a pre-mixing machine at 100 rpm for 2 hours.
(b) Ball-milling dispersion process: Use a zirconium-oxide milling balls with diameter between 0.3 and 0.4 mm. The volume of milling balls occupies 70% of the milling chamber. The speed of the milling balls is 3000 rpm for 2 hours.

After the processes described above, the interval of the acrylic modified clay has increased from 12.41 Å to 60.4 Å. The distribution of bead diameters is changed from D(50)=2.3 μm to D(50)=150 nm. The thick liquid after the processes described above has a pH-value of 7 with interface potential being −30 mV.

3. Combination of PS (Core) and Acrylic Modified Clay (Shell):

In the present step, electrostatic adhesion principle is used for coating the core and shell. When two solids have interface potentials of opposite signs in a solution, adhesion effect occurs and they will combine together. The PS core and the acrylic modified clay according to the present invention have electrical potential of opposite signs in a water solution with pH-value of 7 measured by isoelectric point. Thereby, in the solution with the pH-value, coating process can be finished. The details of the experimental steps are described as follows: Take an appropriate amount of polystyrene and disperse it in a water solution with pH-value of 7. AT this moment, the interface potential (z-potential) thereof is 28 mV. Add this polystyrene to an appropriate amount of a water solution of acrylic modified clay, and stir at 300 rpm for an hour. Owing to electrostatic adhesion effect, the polystyrene core and the acrylic modified clay will form a core-shell structure naturally. Finally, the mixture solution is heated to 80° C. for an hour at the stirring speed of 300 rpm. After coating, beads are separated by a refrigerated centrifuge. The appearance of the finished beads is observed by SEM. The bead diameters are approximately between 2 and 4 μm (shown as 10 and 11 in the FIGURE.)

4. Coating of Outermost PMMA:

The experimental method of the present step is seed polymerization. Take an appropriate amount of the core-shell structure produced in step 3 as the seeds (abbreviated as S) and add into the polymerization solvents described below to finish the outermost coating. The polymerization solvents includes:

(a) Hexane, 100 mL; polydimethylsiloxane (PDMS), 0.5 gram. Both are mixed and heated to 70° C., and are stirred sufficiently for 10 minutes.

(b) MMA, 5 grams; AIBN (initiator), 0.5 gram. Both are mixed completely.

The polymerization steps are described as follows: First add the seeds (S) into the (a) polymerization solvent and stir for 30 minutes. Then (b) is added and stirred at 200 rpm and 70° C. After polymerization for 2 hours, the outermost PMMA coats the surfaces of the seeds to form the final core-shell-structured beads of PS(core)-Clay(shell)-PMMA (shell) (shown as 10, 11, and 12 in FIG. 1.) The beads are separated by refrigerated centrifugal method. The bead diameters are approximately between 4.5 and 6.5 μm 5. Performance Test:

The physical properties of the diffusion beads with a core-shell structure according to the present embodiment are shown in the following table:

| Bead diameter (μm) | Thermal stability (° C.) | Refraction index |
|---|---|---|
| 4.5-6.5 | 280 | 1.43-1.52 |

6. Embodiment of a Diffusion Sheet:

The present embodiment adopts a coating process. First, the diffusion beads according to the present invention are distributed in the optical-class PMMA binder form the coating material. Then, wet-coating method is applied to coat the coating material on a PET to form a diffusion sheet.

(a) Preparation of the Coating Material:

In order to prepare coating materials with different solid contents, an appropriate amount of the diffusion beads (~6 μm) according to the present invention is mixed sufficiently with optical-grade PMMA binder (UV hardened type) to form the coating materials. The solid contents of the coating are adjusted as 5 wt %, 10 wt %, 15 wt %. The viscosities thereof are 220, 256, and 310 cps (measured under 22° C., 20 rpm), respectively. After a 30-day settlement test, no sedimentation is observed. It shows that the distribution of the diffusion beads according to the present invention is excellent.

(b) Coating Experiment:

A 5-centimeter square of PET sheet is treated first using primer. Then it is illuminated by a UV light to increase its adhesion with the PMMA binder. Then, using the spin coating on both side of PET sheet combine with UV light to perform drying and crosslinking treatments. Thereby, a diffusion layer with scrap and wear resistance is formed.

(c) Optical Measurement Results

The present experiment mainly measures haze. The measurement data are shown in the following table:

| Solid content | Transparency (%) | Reflectivity (%) | Haze (%) | Pencil hardness test |
|---|---|---|---|---|
| 0 | 97 | 23 | — | 2B |
| 5 wt % | 92 | 4.3 | 83 | 7H |
| 10 wt % | 85 | 4.1 | 85 | 7H |
| 15 wt % | 81 | 3.9 | 88 | 7H |
| Commercial PMMA beads 30 wt % | 91 | 20 | 80 | — |

From the above table, by adding 5 wt % of the diffusion beads according to the present invention can reduce reflectivity from original 23% to 4.3% with transparency of 92% and haze of 83%. The results, as compared to commercial PMMA diffusion beads, show that the diffusion sheet manufactured by the diffusion beads according to the present invention uses less amount of diffusion beads with superior optical characteristics. In addition, it is also scrap and wear resistant (pencil hardness test is increased from 2B to 7H).

The invention claimed is:

1. Diffusion beads with a multi-layer structure for efficient light diffusion, the multi-layer structure of a bead comprising:
   a core formed of a first organic polymer material composition;
   a shell formed of inorganic material surrounding the core; and
   an outermost layer formed of a second organic polymer material composition surrounding the shell.

2. The diffusion beads of claim 1, wherein the first and second organic material compositions are selected from the group consisting of polystyrene, PMMA, PC, silane, PET, and nylon.

3. The diffusion beads of claim 1, wherein the inorganic material is selected from the group consisting of nanoclay, $SiO_2$, $TiO_2$, and $CaCO_3$.

4. The diffusion beads of claim 1, wherein a distribution of diameters of the bead is between 150 nm and 6.5 μm.

5. The diffusion beads of claim 1, wherein a distribution of diameters of the bead is between 4.5 and 6.5 μm.

6. A diffusion sheet having a plurality of diffusion beads with a multi-layer structure comprising:
   an organic polymer binder formed as a sheet; and
   a plurality of diffusion beads with a multi-layer structure disposed in the organic polymer binder, the multi-layer structure of each bead comprising,
   a core formed of a first organic polymer material composition;
   a shell formed of inorganic material surrounding the core; and
   an outermost layer formed of a second organic polymer material composition surrounding the shell.

* * * * *